R. C. WHIPPLE.
MILK PAIL ATTACHMENT.
APPLICATION FILED SEPT. 22, 1917.
1,284,515.
Patented Nov. 12, 1918.
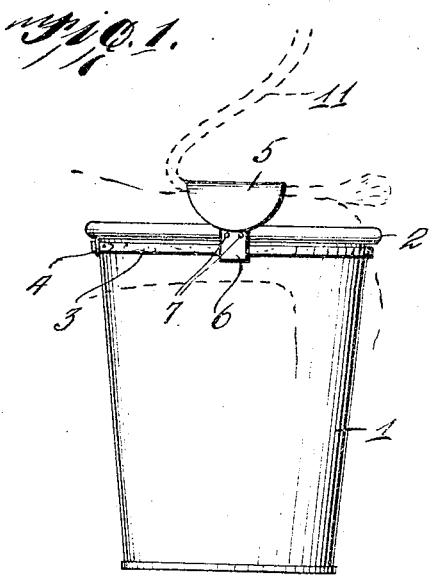
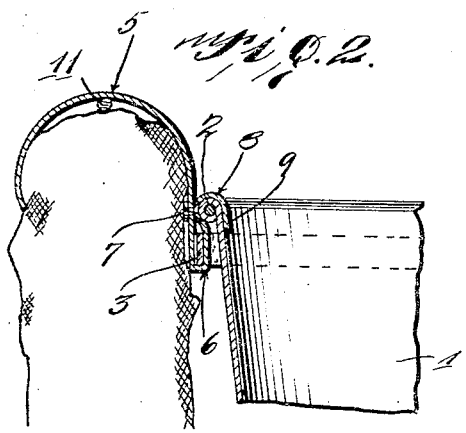
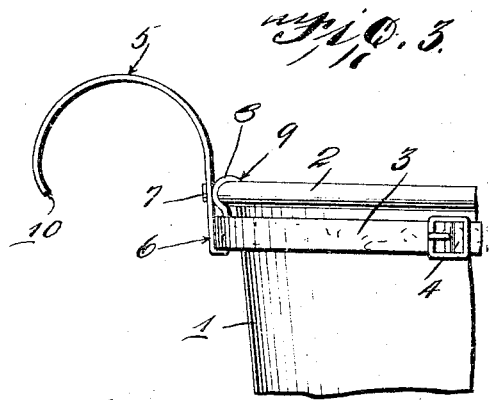
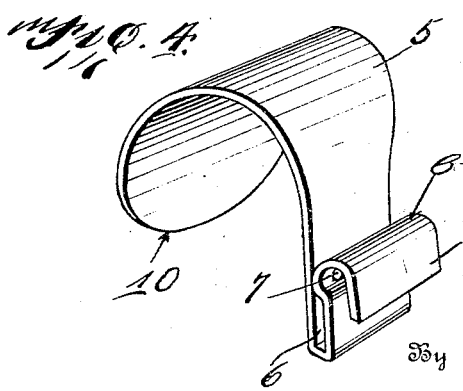
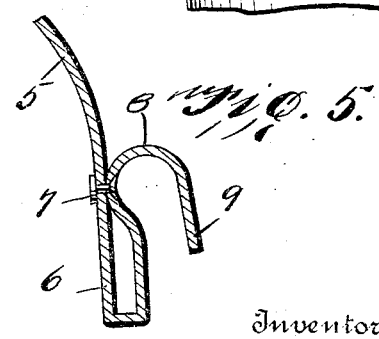
Inventor
R. C. Whipple,
By
his Attorneys

UNITED STATES PATENT OFFICE.

ROY C. WHIPPLE, OF BLOOMVILLE, NEW YORK.

MILK-PAIL ATTACHMENT.

1,284,515.  Specification of Letters Patent.  Patented Nov. 12, 1918.

Application filed September 22, 1917. Serial No. 192,794.

*To all whom it may concern:*

Be it known that I, ROY C. WHIPPLE, a citizen of the United States of America, residing at Bloomville, in the county of Delaware and State of New York, have invented certain new and useful Improvements in Milk-Pail Attachments, of which the following is a specification, reference being had therein to the accompanying drawing.

This invention relates to a milk pail attachment and has for its principal object the production of simple and efficient attachment which may be readily and conveniently attached to a milk pail for efficiently supporting a milk pail upon the knee of the milker.

Another object of this invention is the production of a simple and efficient milk pail holder which may be supported upon the knee of the milker, and under which the tail of the cow may be placed for causing the cow to be less liable to kick, while milking. By holding the cow's tail under the holder, a more sanitary condition will be created for preventing the tail from switching over or into the contents of the pail.

With these and other objects in view this invention consists of certain novel constructions, combinations and arrangements of parts, as will be hereinafter fully described and claimed.

In the accompanying drawing:—

Figure 1 is a side elevation of the milk pail, showing the holder supported thereon.

Fig. 2 is a section through the milk pail showing the holder also in section applied to the knee of a milker.

Fig. 3 is a side elevation of one of the holders or supports.

Fig. 4 is a detail perspective of one of the holders.

Fig. 5 is an enlarged vertical section through the lower end of one of the holders.

By referring to the accompanying drawing, it will be seen that 1 designates the pail, which is provided with the usual roller rim 2 around the top thereof. A suitable securing strap 3 passes around the pail 1 and this securing strap 3 is provided with a suitable securing buckle 4 whereby the ends of the strap may be firmly secured and tightly bound around the upper end of the pail 1.

A primary supporting clamp 5 is secured to each side of the strap 3 and this supporting clamp 5 is provided with a looped elongated portion 6 provided with parallel sides formed therein to produce a guiding or securing portion through which the strap 3 may pass. This loop 6 is riveted at its upper end by means of suitable braces or other fastening means 7 and the inner end of the clamp is provided with an overhanging auxiliary hook portion 8 having an outwardly extending straight tongue 9 for permitting the looped portion 8 to snugly fit over the roller portion 2 of the pail 1. The top portion of the clamp is curved outwardly to produce a supporting yoke in the nature of a hook for fitting snugly over the knee of a milker and permitting the bucket to be sufficiently supported for operation. This hook portion 5 is curved gradually upon its lower end 10 to permit the same to be easily placed over the leg of the milker in order to support the bucket 1 in a proper position. It should be understood that while milking, the tail of the cow indicated by the numeral 11 may be placed under the clamp 5 and in this way will be held against switching and thereby create a sanitary condition by preventing the tail from switching over or into the contents of the bucket. It should be understood that this clamp will constitute a very efficient means for supporting a milk pail and further it should be understood that the clamp may be struck from a sheet of metal, thereby greatly minimizing the cost of manufacture.

What is claimed is:—

A device of the class described formed from a single piece of sheet metal provided with a large hooked end and with a smaller hooked end, said ends being integral with an elongated looped portion, said looped portion provided with flat parallel sides, said smaller hooked end bent inwardly and having fastening means passing through the inwardly bent portion and through a portion of the large hooked end, and said elongated loop adapted to receive a flat strap, substantially as shown and described.

In testimony whereof I hereunto affix my signature.

ROY C. WHIPPLE.

Copies of this patent may be obtained for five cents each, by addressing the "Commissioner of Patents, Washington, D. C."